Dec. 13, 1955   J. H. COUNTRYMAN   2,726,679
MIXING VALVE
Filed July 23, 1952   2 Sheets-Sheet 1
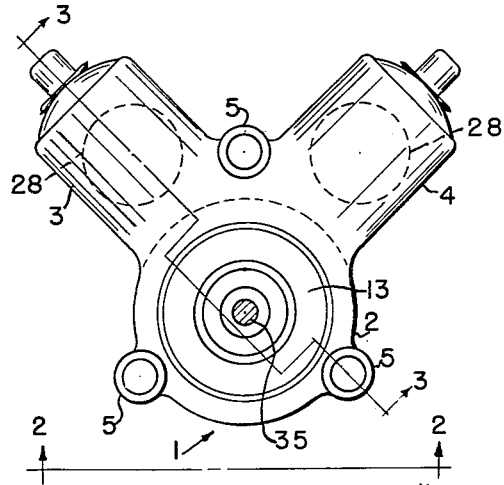
FIG-1
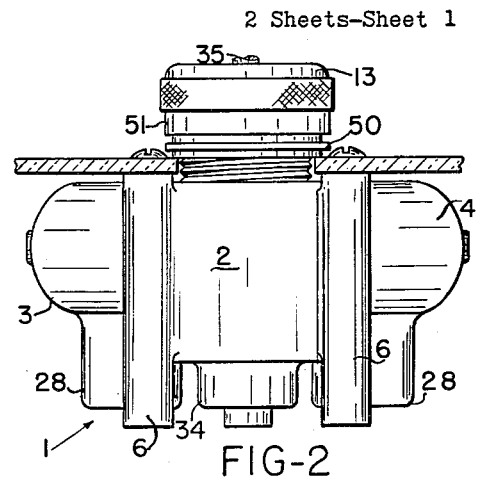
FIG-2
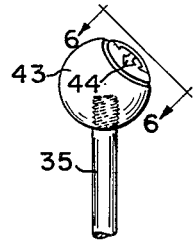
FIG-3
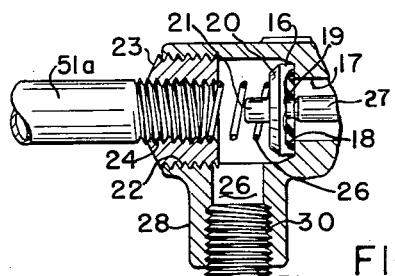
FIG-6
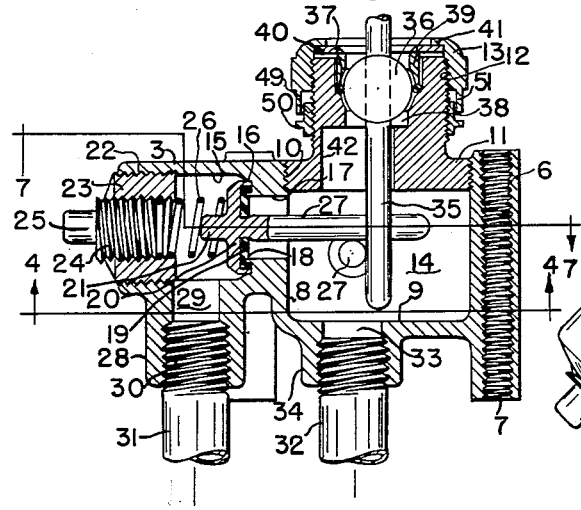
FIG-4
FIG-5
INVENTOR
JAMES H. COUNTRYMAN
BY Toulmin & Toulmin
ATTORNEYS Dec. 13, 1955  J. H. COUNTRYMAN  2,726,679
MIXING VALVE
Filed July 23, 1952  2 Sheets-Sheet 2
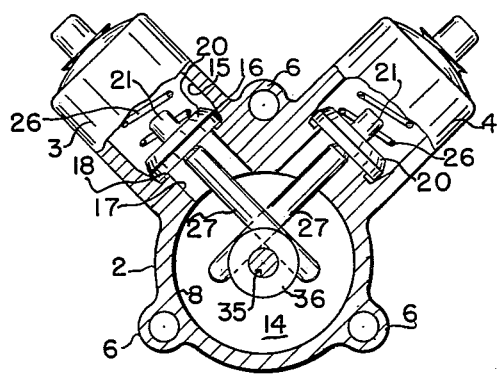
FIG-7
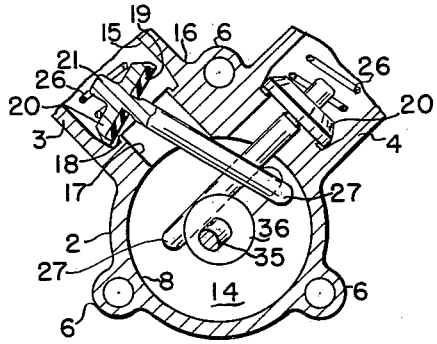
FIG-8
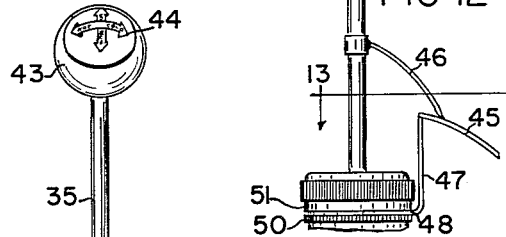
FIG-9   FIG-10
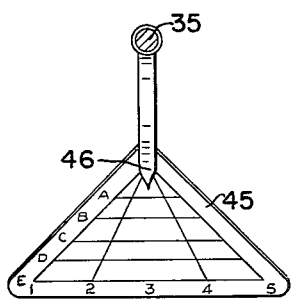
FIG-12
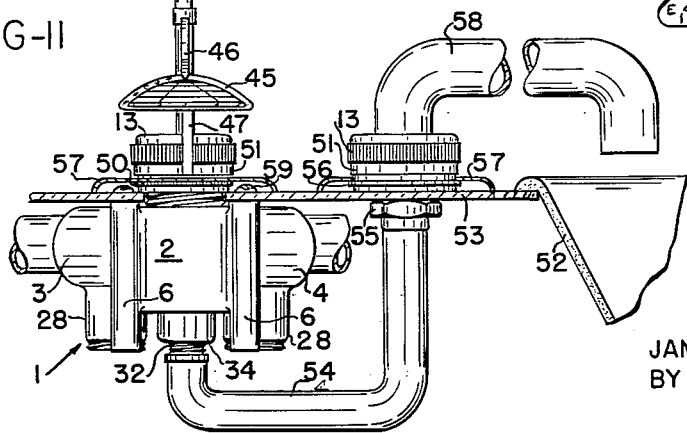
FIG-11
FIG-13
INVENTOR
JAMES H. COUNTRYMAN
BY Toulmin & Toulmin
ATTORNEYS

United States Patent Office 2,726,679
Patented Dec. 13, 1955

2,726,679

MIXING VALVE

James H. Countryman, Dayton, Ohio

Application July 23, 1952, Serial No. 300,547

15 Claims. (Cl. 137—555)

The present invention relates to valves, and more particularly to apparatus for mixing fluid of different state and character, including a mixing chamber and cooperating valves for controlling and dispensing the mixed fluid.

The present valves on the market which are used for mixing liquids at different temperatures or different viscosities or of different ingredients, tend to change the rate of flow when the mixture is varied. Thus, in the case of valves for shower baths, when it is desired to change from cold to hot or vice versa, the movement of the valve provides not only the desired temperature changes in the mixed water, but also changes the pressure or volume of the water. This is a distinct disadvantage since the user of the mixed water may desire a constant flow and only a change in the temperature of the water.

Moreover, in valves of the prior art, the ratio of mixing does not remain constant as the valve opening is changed, but may vary, particularly in the smaller ranges of fluid discharge. This is due in some measure to the fact that diaphragms of these valves open extremely rapidly from their closed or sealed positions, so that the rate of opening, and likewise the rate of closing, are not accurately controllable.

The primary object of the invention is to provide a valve for mixing fluids at different temperatures or in different state, and controlling the pressure or volume of the mixed fluid independently of the degree of mixture.

Another object is to provide a valve for mixing fluids at different temperatures or in different state, and controlling the pressure or volume of the mixed fluid without affecting the percentage of mixture.

Still another object is to provide a combined mixing chamber and valve for handling fluids at different temperatures or in different state, and controlling the degree of mixture without affecting the pressure or volume of the mixed fluid.

A further object is to provide a combined mixing chamber and valve for handling liquids at different temperatures or of different characters, and controlling either the rate of discharge or rate of mixing, without affecting the other.

A still further object is to provide a combined mixing chamber and valve for handling liquids at different temperatures or of different compositions, and controlling the rate of flow of either of said liquids with respect to the other as they enter the mixing chamber while maintaining the rate of discharge of the mixed liquid substantially constant.

Another object is to provide a valve for the control of liquid in which the cracking of the valve at the time of opening is accomplished with facility and the rate of increase of opening exposed by the valve remains substantially constant as the valve continues to open.

The final object is to provide a mixing chamber and valves therefor for controlling the passage of two or more fluids therethrough and selectively operating the valves to change the degree of mixing of the fluids without changing the total discharge volume; or in the alternative, to change the discharge volume without changing the degree of mixing; or in the second alternative, of obtaining any predetermined relation between the degree of mixing and the discharge volume.

Other objects and features will be apparent as the specification is perused in connection with the accompanying drawings, in which:

Figure 1 represents a plan view of the improved mixer valve;

Figure 2 is an elevational view, but showing portions of the support member in section;

Figure 3 is a vertical sectional view with some of the parts, such as the valve rods, pipes, springs and the control rod, in elevation; this section was taken along the line 3—3 in Figure 1;

Figure 4 depicts a transverse sectional view of the valve and mixing chamber taken along the line 4—4 in Figure 3;

Figure 5 is a plan view of the knob on the operator or control rod;

Figure 6 represents a transverse secetional view with a few parts in elevation, of the end construction of a modified form of the mixer valve;

Figure 7 is a partly sectional and partly elevational view of the mixer valve, taken along line 7—7 in Figure 3; this view shows the valve washer in the "Off" position;

Figures 8, 9 and 10 are views similar to Figure 7, but showing the valve or valve washers in various other positions during operation;

Figure 11 represents, in elevation, the improved mixer valve combined with a swinging spout;

Figure 12 is a detail view of an indicator accessory by which any position of the control rod can be duplicated in order to duplicate the degree of mixing or the amount of water force at the discharge; and Figure 13 is a view taken along line 13—13 of Figure 12, with the lower nut portion removed and showing in plan, the position duplicating indicator member.

Referring more especially to Figs. 1, 2, 3 and 4, reference character 1 generally represents a casing which may be molded out of metal or plastic. The casing comprises a vertical partial cylindrical portion 2 from which extends, in the lateral direction, a pair of cylindrical portions 3, 4 arranged preferably at right angles to one another. At three positions about the casing, as indicated at 5, there are vertically extending elongated bosses 6 having threaded openings 7 for receiving screws by which the casing may be secured to any suitable support.

The cylindrical portion 2 of the casing is provided with a large circular opening 8, closed at the bottom 9 and provided with threads 10 at the top (Fig. 3). These threads receive a cylindrical plug 11 which has a threaded reduced diameter portion 12. A threaded cylindrical cap 13 engages the threads of the portion 12. The purpose of this threaded portion and the cap will be described hereinafter. Thus, when the plug 11 is screwed in place, a mixing chamber 14 is left within the casing.

The cylindrical members 3, 4 are provided with a horizontal bore 15 which leaves a shoulder 16 at the inner ends and the large bore communicates with a smaller opening 17 which leads into the mixing chamber 14.

The shoulder 16 is provided with a short annular flange 18 immediately adjacent the opening 17, which flange serves as a seat for a valve. The valve may comprise a rubber or plastic circular washer 19 having an annular groove cut therein to loosely receive the flange 18, this washer being held within a countersunk portion of a metal backing member 20 provided with an outwardly extending centrally positioned knob 21.

The outer end of the bore 15 is provided with threads 22 for receiving a threaded plug 23. There is a central threaded opening in the plug for receiving a screw member 24, provided with a hexagon nut extension 25. The screw member is of shorter length than the plug 23 and thereby leaves an opening which can loosely receive a spring 26. The latter is held in place by the knob 21. Thus the spring serves to press the backing member 20 of the valve away from the screw member 24, thereby holding the valve tightly on its seat.

The backing member 20 is provided with an integral rod 27, called a valve rod, which extends into the mixing chamber 14. It will be understood that both of the casing portions 3, 4 are provided with the valve washer 19 and the spring pressed backing member 20, also with the valve rod 27.

However, the longitudinal axis of one of the valve assemblages is at a different transverse level than the other valve assemblage in order that the valve rods 27 may cross one another, as indicated more plainly in Fig. 4, one above the other, and preferably in touching relation. The purpose of this will be explained hereinafter.

Each of the cylindrical casing portions 3, 4 are provided with a downwardly depending extension 28 having a bore 29 which communicates with the passageway 15. The lower end of this bore is somewhat enlarged and threaded as indicated at 30 to receive a pipe or conduit 31. There are therefore two pipes leading upwardly into the casing portions 3, 4, these pipes carrying fluid, water or gas at different temperatures, of different ingredients, or in different states and different viscosities.

These fluids delivered by the pipes 31 pass through the openings 29, 15, thence past the open valve 19 into the mixing chamber 14. The discharge outlet for the mixed fluids is indicated by the pipe 32, which is threaded into an opening 33 contained in a downwardly dependent extension 34 from the casing, and which opening is in communication with the mixing chamber 14.

The rods 27 are adapted to be swively moved in a manner to be described hereinafter by tilting the valve washer 19 at any position along its edge on the valve seat and against the action of the spring 26 in order to allow free access between the pipe 31 and the mixing chamber 14, and thence through the discharge pipe 32.

*Valve control mechanism*

For moving the valve rods 27 in a swivel or tilting manner, I employ a control rod 35 which has a large ball bearing 36 swively journaled at the upper end of the plug 11. The lower end of the control rod is arranged so that it is always in contact with both of the normally positioned valve rods 27, so that by swinging the control rod in an arcuate direction, both of the rods 27 are caused to move in the same direction as the lower end of the control rod and thus one or both of the valves 19 are tilted from their seats.

The springs 26 cause the movements of the valves 19 to follow the instantaneous movements of the control rod 35, both through maximum and minimum distances, so that this tilting effect of the valves is at all times under the control of the rod 35.

Various ways will occur to those skilled in the art for swively journaling the ball bearing 36 but preventing rotation. In the preferred embodiment shown in Fig. 3 the swivel contact is constituted of an O rubber ring 37 which is held on a shoulder formed by an opening of different diameter, as indicated at 38. The ring is held in place by means of a metal sleeve 39 on which rests a washer 40.

The threaded cap 13 is provided with a lip 41 which presses against the washer, when tightened, and thus forces the sleeve 39 downwardly to hold the O ring 37 in position against the shoulder. Thus the control rod 35 can revolve in a circular fashion about the bearing formed between the ball 36 and the O ring 37.

Inasmuch as the character of the movement of the two valve rods 27 is limited to a tilting action at the valves 19, the movement of the control rod 35 must likewise be limited to accommodate its movement to the permissible movement of the valve rods. For this reason the plug 11 is provided with a triangularly shaped bore 42 at a position directly above the mixing chamber 14, the bore of this particular shape serving to allow the lower end of the control rod 35 to move within a triangular area while maintaining contact with the valve rods at every point within that area.

There is a spherical knob 43 screwed on to the control rod 35 and this knob may carry, as an indentation or in raised letters, a pair of angularly positioned arrows 44, as shown in Fig. 5, in which the vertical arrow may have the word "Force" thereon, and the legends "Off" and "On" directly above and below the tips of the arrows. The horizontal arrow may contain the legends "Hot" and "Cold" at the ends.

In order to determine the amount of movement that has been given to the control rod 35 and the direction of movement during operation of the mixer valve, it may be desirable to provide a chart 45 and an indicating pointer 46 attached to the rod, as shown in Figs. 12 and 13. This chart, which can be made of Celluloid or metal, may be supported in any suitable manner from the casing 1 but, as shown, is attached to an upstanding strip 47 which merges into a horizontally positioned ring 48 which fits over a threaded sleeve 49 and is supported on a flange 50.

When the cap 13 is screwed downwardly (Fig. 3), the lower extending edge 51 of the cap will clamp the ring 48 against the flange 50 of the sleeve 49. Thus, the chart 45 may be held rigidly in position.

The chart may comprise any suitable indicia to indicate instantaneous positions of the pointer 46, the latter being formed of spring metal so as to bear lightly on the chart. This indicia may comprise horizontal lines A to E inclusive and sloping lines 1 to 5 inclusive, which generally define a triangular area which is similar, on a magnified scale, to the shape of the triangular opening 42.

Consequently, as the control rod is moved within its restricted triangular area, the pointer will come to rest at one of the divisions determined by the horizontal or vertical lines and, if desired, the position of the pointer and therefore the position of the control rod, can be at any time duplicated to give a predetermined mixing effect as will now be described.

*Operation of the mixer valve as described to this point*

Assume that fluid (liquid or gaseous) of different temperatures, different viscosities, different characters, or at different pressures are admitted to the pipes 31 and it is desired to mix these fluids in a predetermined proportion. An example of this situation is in the case of a shower-bath valve where the user might wish to change the valve to make the water leaving the discharge pipe 32 hotter, or perhaps colder, in any particular degree.

The user would swing the knob 43 in the manner indicated by the arrows 44 and on account of the corresponding swivel effect obtained at the lower end of the rod 35, the valve rods 27 are simultaneously moved in such directions as to admit predetermined amounts of the fluid through the respective pipes 31 into the mixing chamber.

Fig. 7 shows the condition of the valves when the control rod is set vertically upward and therefore is exerting no pressure against either of the valve rods 27. In this case the valves are closed.

However, when the knob 43 of the control rod is moved as far as possible in the direction indicated by the "Hot" arrow (Fig. 5), the valve member leading to the cold water pipe will remain on its seat, while the other valve leading to the hot water pipe will be tilted the maximum distance away from its seat, as seen in Fig. 8. It will be noted that the valve tilts along a restricted portion of the edge of the washer that contacts with the seat.

When the knob 43 is moved downwardly (Fig. 5) to the full force "On" position but not moving to the right or left of the vertical center, this will cause each of the valves to be tilted half-way of their maximum distances from their respective seats and the mixing effect becomes 50% of the fluids entering the pipes 31. This is shown in Fig. 9.

When the knob 43 is assumed to be moved toward the right along the horizontal arrow designated "Cold" in Fig. 5, the valve leading to the hot water pipe remains closed, while the valve leading to the cold water pipe opens to its maximum tilting distance, as shown in Fig. 10.

In general, as the knob shown in Fig. 5 is moved in a direction indicated as to the left of the vertical center line and in the direction of the "Hot" arrow, the water becomes hotter. But when moved to the right of this vertical center line, the water becomes colder.

When movement of the knob is vertically downward as seen in Fig. 5, from whatever horizontal position it had been moved, to provide the proper mixture, the force or quantity of the water is increased without changing the mixture, and therefore, the temperature.

On the other hand, if the movement of the knob is in the horizontal direction, to the right or left, from whatever vertical position it had been moved to provide the proper force, the temperature of the water is changed without changing the force of the water.

It is obvious that the knob need not be moved solely in the horizontal or vertical directions but can be moved in a diagonal direction, or even in a circular direction, to take advantage of whatever degree of mix and force of water is desired. The final instantaneous position assumed by the knob to give to the user the right mixture or temperature of water and the right force of water, can be duplicated as may be necessary, by bringing the pointer 46 to a predetermined position on the chart 47, thus assuring a duplicatable proportionate between the fluids passing upwardly through the pipe 31.

In ordinary mixer valves, when hotter water is desired it often happens that the force of water is coincidentally changed, even though the user desired the force of the water to remain the same. However, when using the improved mixer valve in shower baths, the temperature and force of water are at all times under the separate and independent control of the user.

As explained hereinbefore, when the lever is moved along a 45° angle, assuming that the valves are set 90° apart as shown in Fig. 8, as far as it will go, the left-hand valve will be opened full force, but the right-hand valve will remain closed and this position, again, gives the same force of water as is obtained in Fig. 9, except that the temperature or degree of mix has been changed. It is therefore apparent that by proper manipulation of the knob 43, any degree of force of water and any temperature of the mixture can be obtained and also duplicated by means of the chart 45.

Gases can likewise be intermixed, also liquids of different viscosities, or of different character, in which case the movement of the knob 43 would regulate or control the rate of flow and also the degree of mixture.

In Fig. 6 there is shown a modification of the mixer valve in that instead of the incoming pipes 31 being attached to the dependent members 28, the pipes 51A are now screwed into the plug 23 after the screw member 24 has been removed.

Suitable plugs 51B are inserted into the threaded openings in the depending members 28 left by the removal of the pipes 31. It is apparent that in certain types of installations it may be more convenient to have the incoming pipes enter the mixer valve from the horizontal directions rather than in the vertical directions.

In Fig. 11 there is shown one typical use of the improved mixer valve as applied to a kitchen sink. The sink is indicated at 52 and the sink board at 53. A U-shaped pipe 54 extends from the outlet pipe 32 of the valve 1 through an opening in the sink board and is secured thereto by a nut 55. There is a large nut 56 with a knurled edge, similar to element 50 of Fig. 3, screwed to the upstanding end of the pipe 54 and this nut supports a concave-shaped plate 57 on the knurled edge.

The nut 56 is provided with an upstanding threaded projection which extends through the plate member. This threaded projection engages the threads of a knurled cap screw 13, similar to that described in connection with Fig. 3. This cap screw provides the necessary leak-proof but swivel effect for a swinging spout 58.

The mixer valve 1 is secured to the sink plate 53 by means of screws 59 and the ornamental form of washer or plate 57 is employed to hide the heads of the screws. Therefore, by means of the knob 43, the housewife can obtain water of any temperature and force desired.

From the foregoing, it is evident that I have disclosed an improved mixer valve that can be used in connection with any kind of fluid, gaseous or liquid, for the purpose of mixing the fluid in any desired and duplicatable proportions and obtain any desired and duplicatable discharge pressure or force. The degree of mixing can be maintained constant, while the force at the discharge can be increased or decreased, and also the latter may be maintained constant while the degree of mixing is changed.

The valves are inexpensive to manufacture in that the washers are of uniform thickness throughout their diameter and can be sheared from plastic or rubber tubing. The backing member of the valve is rugged and the springs 26 can be readily replaced by simply removing the screw member 24. The O ring 37 serves not only as a swivel bearing having a long life for the ball 36, but also effectively prevents any leakage from the mixing chamber 14 to the exterior of the valve.

There are no rotating parts within the improved mixer valve and only one swivel member, namely the control rod 35. Consequently the parts do not tend to wear out and the valve as a whole has a long life.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent is:

1. A mixer valve comprising a mixing chamber formed of a casing having a plurality of fluid passageways located transversely of one another about the casing but out of alignment with one another, valves and valve seats in said passageways, said valves being tiltable on their seats, valve rods attached to said valves and angularly positioned with respect to one another, means for selectively operating said valve rods singly and together in order to tilt the valves from their seats, said means comprising a control rod extending into the casing as far as the valve rods and in peripheral contact therewith, said control rod being pivotally mounted within the casing and movable in at least two rectilinear directions at right angles to one another to cause the valves to be separately and collectively tilted from their seats depending on the direction in which the control rod is moved.

2. A mixer valve comprising a mixing chamber formed of a casing having a plurality of fluid passageways located substantially in the same transverse plane but angularly positioned with respect to one another, spring-pressed valves and valve seats in said passageways, said valves being adapted to be tilted on their seats to an open-valve position, valve rods of solid configuration attached to said valves, said rods being angularly positioned with respect to one another, means for selectively operating said valve rods singly and together, said means comprising a control rod extending into the casing as far as the valve control rods and in peripheral contact therewith, said control rod being pivotally mounted within the casing and tiltable in a plurality of directions to cause the valves to be separately and collectively controlled depending on the direction in which the rod is tilted.

3. A valve rod comprising a mixing chamber formed of a casing having a plurality of fluid passageways extending transversely of the casing but out of alignment with one another, said passageways being closed by valves, seats for the valves, said valves being tiltable on their seats to open the respective passageways, solid rods for said valves, said rods extending transversely of one another, and a control rod extending from the exterior of the casing into the mixing chamber and slidably contacting the peripheries of said valve rods, said control rod being pivotally mounted in said chamber and movable in at least two rectilinear directions so that pressure can be exercised against the valve rods to cause them to move in directions depending on the movements of the control rod about the pivot in order to tilt the valves from their seats.

4. A mixer valve comprising a mixing chamber formed of a casing having a plurality of fluid passageways extending transversely of the casing and at right angles to one another, said passageways being closed by valves, seats for the valves, said valves being tiltable on their seats to open the respective passageways, valve rods of solid configuration for said valves, said rods extending at right angles with respect to one another and a control rod extending from the exterior of the casing into the mixing chamber and contacting the peripheral surfaces of said valve rods, said control rod being pivotally mounted in said chamber and movable in a plurality of rectilinear directions so that pressure can be exercised against the valve rods to tilt the valves from their seats when the control rod is moved about its pivot in one of said rectilinear directions.

5. A mixer valve comprising a mixing chamber formed of a casing having a plurality of fluid passageways extending transversely of the casing but out of alignment with one another, valves in said passageways, seats for said valves, said valves being adapted to open by pivotally swinging one edge thereof about the seat, solid valve rods for said valves, said rods being angularly positioned with respect to one another, and means for simultaneously pressing said valve rods in lateral directions to cause the predetermined valve or valves to be tilted from their seat, said means including a pivoted lever extending from a position abutting the peripheries of said valve rods to a position exterior of said casing.

6. A mixer valve comprising a mixing chamber formed of a casing having a plurality of angularly positioned valve seats, inlet and outlet pipes communicating therewith to admit fluid into or discharge fluid out of the mixing chamber, valves on said seats and tiltable thereon, valve rods of solid configuration attached to said valves, said rods crossing one another at angular positions within the mixing chamber, a control rod extending into the casing and contacting the peripheral surfaces of said valve rods at their crossed positions, said control rod being pivotally mounted intermediate of its length and within the casing to swing at least in two directions at right angles to one another, whereby as the lever is swung about its pivot, pressure is exerted against all of the valve rods at the closed position to tilt the valves from their seat, separately or in unison depending on the direction in which the lever is swung.

7. A mixer valve comprising a mixing chamber formed of a casing having a plurality of fluid passageways located substantially in the same transverse plane but angularly positioned with respect to one another, valves in said passageways, valve rods of solid configuration attached to said valves, said rods extending transversely and crossing one another in said chamber, a control rod contacting the peripheries of said valve rods at the crossing point and extending normal with respect to said valve rods, said control rod being pivoted within the casing and extending to the exterior thereof, and means for restraining the pivotal movement of the control rod to a path as defined by a triangular area which will embrace all tilted positions of the valve rods as the control rod is moved to operate the valves.

8. A mixer valve comprising a mixing chamber formed of a casing having a plurality of fluid passageways located in the same transverse plane but angularly positioned with respect to one another, valves and valve seats in said passageways, valve rods of solid configuration attached to said valves and crossing one another within said chamber, means for operating said valves to control the inlet and discharge of fluid to and from the mixing chamber, said means comprising a manually operable rod extending into said chamber defined by the cross-over portions of the valve rods, said control rod contacting the peripheries of said valve rods and adapted to be moved in the transverse direction against said valve rods in order to control the opening and closing of said valves.

9. A mixer valve comprising a mixing chamber formed of a casing having a plurality of fluid passageways extending transversely of the casing, valves in said passageways, valve rods of solid configuration attached to said valves, said rods extending toward one another and crossing over at a position within the mixing chamber, a control rod pivotally mounted within the casing and extending into the mixing chamber, the inner end of said control rod being adapted to contact simultaneously the peripheries of all of the valve rods, and the movement of the contacting portions of the control rod being confined to an area as will cause the valves selectively to open sequentially and simultaneously in predetermined order and amounts.

10. A mixer valve comprising a mixing chamber formed of a casing having a plurality of transversely disposed fluid passageways, spring-urged valves in said passageways, seats for said valves, said valves being adapted to tilt on their respective seats against the action of the springs, valve rods of solid configuration secured to said valves and extending into the mixing chamber to a point of cross-over, said valve rods being adapted to be moved in a transverse direction at the cross-over point about fulcrums represented by a limited portion of the edge of each valve as it tilts about the seat, and means comprising a control rod bearing against the peripheral surfaces of the valve rods within said chamber and extending into the exterior of the casing, said control rod being pivoted within the casing and adapted to be swung through an arc at the point where the peripheral contact with the valve rods is made, said valve rods being caused by the spring-urged valves to follow the swinging movement of the control rod.

11. A mixer valve comprising a mixing chamber formed of a casing having a plurality of transversely disposed fluid passageways, spring-urged valves in said passageways, seats for said valves, said valves being adapted to tilt on their respective seats against the action of the springs, valve rods of solid configuration secured to said valves and extending into the mixing chamber to a point of cross-over, said valve rods being adapted to be moved in a transverse direction at the cross-over point about fulcrums represented by a limited portion of the edge of each valve as it tilts about the seat, and means comprising a control rod bearing against the peripheral surfaces of the valve rods within said chamber and extending into the exterior of the casing, said control rod being pivoted within the casing and adapted to be swung through an arc at the point where the peripheral contact with the valve rods is made, said valve rods being caused by the spring-urged valves to follow the swinging movement of the control rod, and an indicator at the upper end of the control rod exterior of the casing to indicate the instantaneous positions of the valves as the upper end of the rod is swung to predetermined positions.

12. A mixer valve comprising a mixing chamber formed of a casing having a plurality of transversely disposed fluid passageways, spring-urged valves in said passageways, seats for said valves, said valves being adapted to tilt on their respective seats against the action of the springs, valve rods secured to said valves and extending into the mixing chamber to a point of cross-over, said valve rods being adapted to be moved in a transverse direction at the cross-over point about fulcrums represented by a limited portion of the edge of each valve as it tilts about the seat, means comprising a control rod of solid configuration having its periphery bearing against the valve rods within said chamber and extending into the exterior of the casing, said control rod being pivoted within the casing and adapted to be swung through an arc at the point where the peripheral contact with the valve rods is made, said valve rods being caused by the spring-urged valves to follow the swinging movement of the control rod, and means for indicating the position of the control rod and the control valves at any instant during operation, said means comprising a stationary chart member and a pointer secured to the control rod which is adapted to move over the chart member, whereby the reading on the chart indicates the movement of the control rod and the consequential movement of the valve rods.

13. A mixer valve for fluids, comprising a casing containing a plurality of tiltable spring-pressed valves, seats therefor, and valve stems positioned angularly with respect to one another, a mixing chamber within the casing, said valve stems crossing one another within said chamber, inlet pipes secured to the casing and communicating with said valves on the opposite side thereof from the valve rods, an outlet pipe communicating with said mixing chamber, and a control rod pivotally mounted within said casing and extending from the exterior thereof into the mixing chamber, said control rod being in contact with all of said valve stems where they cross over, whereby as the control rod is swung about its pivot, one or more of the valves are caused selectively to open and close, depending on the direction in which the control rod is moved, whereby the degree of mix of the fluids in the mixing chamber and the force of the discharge fluid through said outlet pipe are selectively controlled.

14. A mixer valve comprising a mixing chamber formed of a casing having a plurality of fluid passageways located transversely of one another about the casing but out of alignment with one another, valves and valve seats in said passageways, said valves being tiltable on their seats, valve rods attached to said valves and positioned transversely of one another within said chamber, control means for selectively operating said valve rods singly and together, said means extending from the interior to the exterior of the casing in order to operate the valve rods from the exterior, the inner end of said control means bearing against the peripheral surfaces of the valve rods, the outer end of said control means being movably supported in the casing and movable in at least two rectilinear directions, in one direction of which the valves are singly tilted from their seats and in the other direction the valves are collectively tilted.

15. A mixer valve comprising a mixing chamber formed of a casing having a plurality of fluid passageways located transversely of one another about the casing but out of alignment with one another, valves and valve seats in said passageways, said valves being tiltable on their seats, valve rods attached to said valves, and positioned transversely of one another within said chamber, control means for selectively operating said valve rods singly and together, said means extending from the interior to the exterior of the casing in order to operate the valve rods from the exterior, the inner end of said control means bearing against the peripheral surfaces of the valve rods, the outer end of said control means being movably supported in the casing and movable in at least two rectilinear directions in different planes, in one of said directions the valves are singly tilted from their seats and in the other direction the valves are collectively tilted.

References Cited in the file of this patent
UNITED STATES PATENTS

| | | |
|---|---|---|
| 963,221 | Haynes | July 5, 1910 |
| 977,562 | Sloan | Dec. 6, 1910 |
| 2,106,929 | McClure | Feb. 1, 1938 |
| 2,171,992 | Rantine | Sept. 5, 1939 |
| 2,229,213 | Kubiliunas | Jan. 21, 1941 |
| 2,578,362 | Kluver | Dec. 11, 1951 |